United States Patent [19]

Evans

[11] Patent Number: 4,821,836

[45] Date of Patent: Apr. 18, 1989

[54] VEHICLE INTEGRAL SPEEDOMETER AND AUTOMATIC DOOR LOCK SYSTEM

[75] Inventor: John L. Evans, Huntsville, Ala.

[73] Assignee: Chrysler Motors Corporation, Highland Park, Mich.

[21] Appl. No.: 222,395

[22] Filed: Jul. 18, 1988

Related U.S. Application Data

[63] Continuation-in-part of Ser. No. 47,090, May 8, 1987, abandoned.

[51] Int. Cl.[4] ........................ B60R 21/00; B60K 28/12

[52] U.S. Cl. .................................... 180/289; 180/281

[58] Field of Search ........................ 180/281, 271, 277; 70/237, 264

[56] References Cited

U.S. PATENT DOCUMENTS

| | | | |
|---|---|---|---|
| 3,613,820 | 10/1971 | Bozoian | 180/281 |
| 3,647,016 | 3/1972 | Fitzsimons | 180/281 |
| 3,722,615 | 3/1973 | Okada et al. | 180/281 |
| 3,765,502 | 10/1973 | Mark | 180/281 |

*Primary Examiner*—Richard A. Bertsch
*Attorney, Agent, or Firm*—Wendell K. Fredericks

[57] ABSTRACT

Automatic locking of the vehicle door locks by a relay controlled by sine and cosine voltage signals from a frequency to voltage (F/V) converter. A pulse-train signal whose pulse repetition rate varies with the speed of the vehicle is used to supply frequency information to the F/V converter.

4 Claims, 2 Drawing Sheets

VEHICLE INTEGRAL SPEEDOMETER AND AUTOMATIC DOOR LOCK SYSTEM

This application is a continuation-in-part, of application Ser. No. 07/047,090, filed May 8, 1987, now abandoned.

BACKGROUND OF THE INVENTION

1. Field of the Invention

The present invention relates generally to vehicle integral speedometer and automatic door lock systems and, more specifically, to systems of the type wherein the power door locks automatically lock after the vehicle reaches a predetermined speed.

2. Description of the Prior Art

The prior art teaches using a speed sensor circuit along with a distance sensor transducer coupled to a vehicle drive shaft or to a speed take off of a transmission. The speed sensor circuits generally consist of a digital to analog converting circuit coupled to the distance sensor and activated by a manual door jamb switch. This invention departs from the prior art by utilizing a frequency to voltage converting circuit used for both the speedometer and the automatic door lock system which is less susceptible to a variety of automotive environmental conditions which passive components associated with the digital to analog converting and manual door jamb switches are subjected to. SUMMARY OF THE INVENTION As a solution to these and other problems, the instant invention comprises an automatic power door lock system which is free from the defects of the prior art. More particularly, the invention comprises an automatic door lock system wherein a relay which powers a door lock automatically energized when a vehicle reaches a predetermined speed. A distance sensor is used to develop a pulse train signal of a pulse-repetition rate proportional to the speed of the vehicle. The distance sensor output signal is coupled to a frequency to voltage circuit which converts the pulse train input signal into complementary sine and cosine waveforms of a varied range of magnitudes and directions. A conventional air-core gauge speedometer employs the sine and cosine waveform signals magnitude and direction information to indicate the speed of the vehicle. A reference point within the range of the complementary waveform is established which, when exceeded in magnitude and direction by the waveforms, a logic signal is developed which activates a relay energizing transistor. The relay is energized only for a chosen duration even though the relay energizing transistor may be turned on.

The invention and its mode of operation will be more fully understood from the following detailed description when taken with the appended drawing figures in which:

DETAILED DESCRIPTION OF A PREFERRED EMBODIMENT

Figure 1:
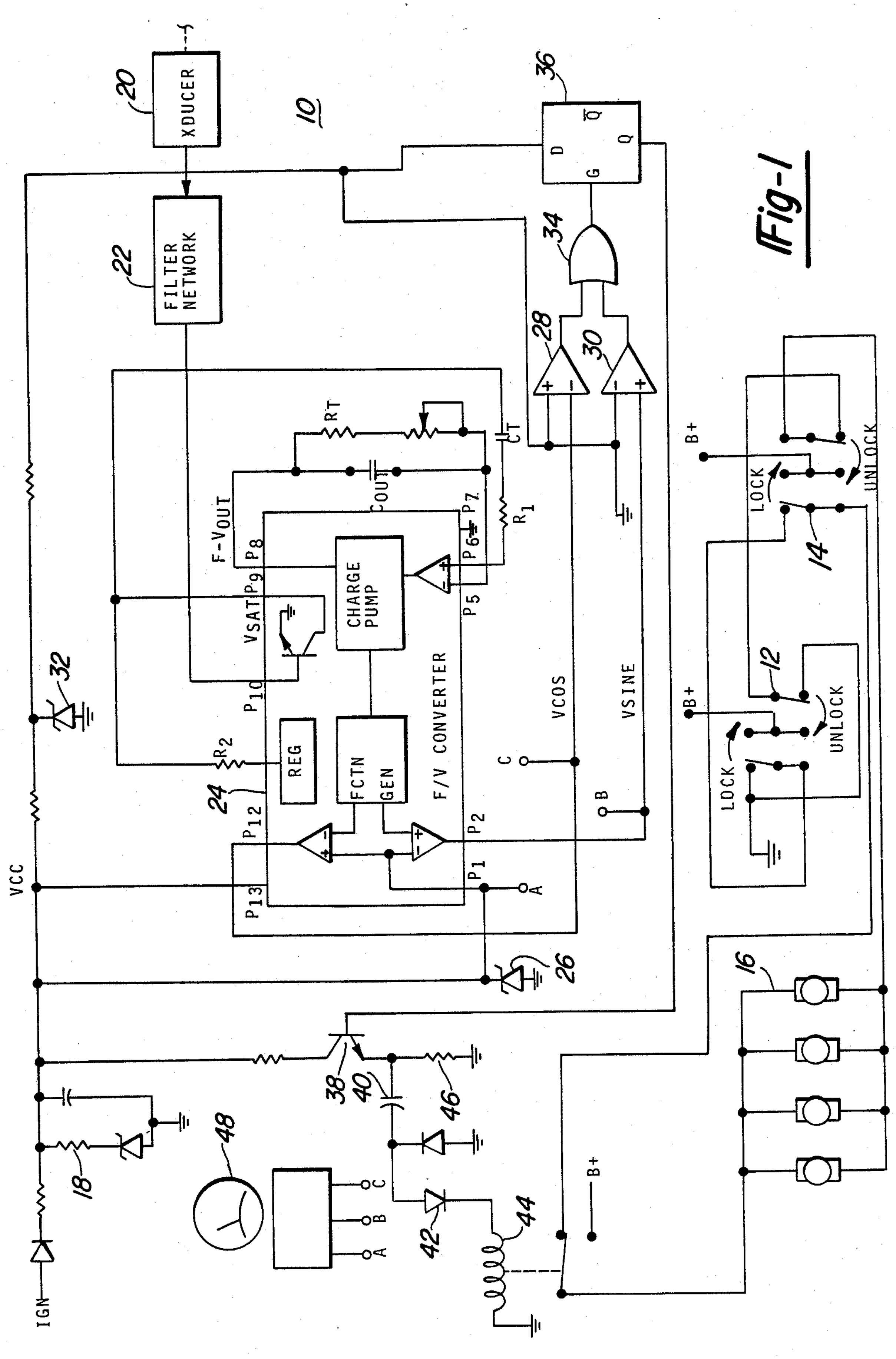
FIG. 1 is a partially block, partially schematic diagram of an illustrative of an integral speedometer and automatic door lock system employing a frequency to voltage conversion circuit.

FIG. 1 is a partially block, partially schematic diagram of a preferred embodiment of an integral speedometer and Vehicle Automatic Door lock System 10. System 10 provides a circuit for manually locking the power driven door locks of the vehicle and another circuit for automatically locking the power locks after the vehicle reaches a predetermined speed, as well as a speedometer which indicates speed of the vehicle at all times during vehicle travel.

Power for the manual lock circuit is supported from a vehicle storage battery (not shown) that provides B+and system ground voltages. This manual circuit includes a left front door, lock/unlock switch 12, right front door, lock/unlock switch 14 interconnected together to permit independent switching of battery power to conventional reversible locking motors 16 via a normally closed contact of a relay 44. The locking motors 16 are normally mounted in the doors of the vehicle and mechanically linked to conventional door lock mechanism (not shown) so as to lock or unlock the lock mechanism when the manual switches 12 and 14, associated with the lock mechanism, are manually operated. Relay 44, except for the normally closed contact, is primarily associated with the automatic door locking circuit of system 10.

The integral speedometer and automatic locking circuit is a signal monitoring and amplification circuit used to monitor the speed of a vehicle through speedometer 48 and when the vehicle reaches a predetermined speed, the circuit drives the door lock motors 16 for a predetermined period to lock the door lock mechanism.

The integral speedometer and automatic locking circuit includes a conventional position sensing transducer 20 mechanically linked to the drive train of the vehicle and electrically connected to system 10 for developing a pulse-train type signal representation of vehicle speed. This signal, which increases in frequency as the vehicle speed increases and varies in amplitude between zero volt and a chosen voltage level, is routed to a conventional filter network 22 which smoothes out any undesired glitches associated with developing the pulse-train signal.

The filtered pulse-train signal from network 22 is applied to pin 10 of a frequency-to-voltage converter circuit 24 such as a tachometer driver unit, model number CS-189-3 made by Cherry Semiconductor Corporation of Greenwich, RI. Circuit 24 comprises a charge-pump circuit for frequency-to-voltage conversion, a shunt regulator for stable operation, a function generator and sine and cosine amplifiers.

The pulse-train signal, after being applied to pin 10 of the f/v converter 24, is buffered through a transistor, then applied to the charge-pump circuitry for frequency conversion. The output voltage of the charge-pump circuitry at pin 8 ranges linearly from about 2.10 volts with no input (Phi=0°) signal at pin 10 to about 7.1 volts (Phi=270°), when the pulse repetition frequency of the input pulse-train signal is maximum.

The charge that appears on capacitor "Ct" is reflected to capacitor "Cout" through a Norton differential amplifier. The frequency repetition of the pulse-train signal applied at pin 10 also charges and discharges capacitor "Ct" through $R_1$ and $R_2$. Capacitor "Cout" reflects the charge as a voltage across resistor RT.

The output waveforms of the sine and cosine amplifiers are derived by on-chip amplifier/comparator circuitry that includes a sine and a cosine amplifier. The various trip points for the f/v converter circuit (i.e., 90°, 180°, 270°) are determined by an internal resistor divider (not shown) that is connected to the voltage regulator. The output voltage "Eo" is compared to the divider network by the function generator circuit. A first Zener diode 26 is used at pin 1 to establish a reference voltage allowing both sine and cosine amplifiers of f/v converter 24 to swing positive and negative with respect to the reference voltage points A, B and C connect the reference voltage and the outputs of the sine and cosine amplifiers to a conventional air-core gauge speedometer 48. The output magnitudes and directions have the relationship as shown in FIG. 2.

Figure 2:
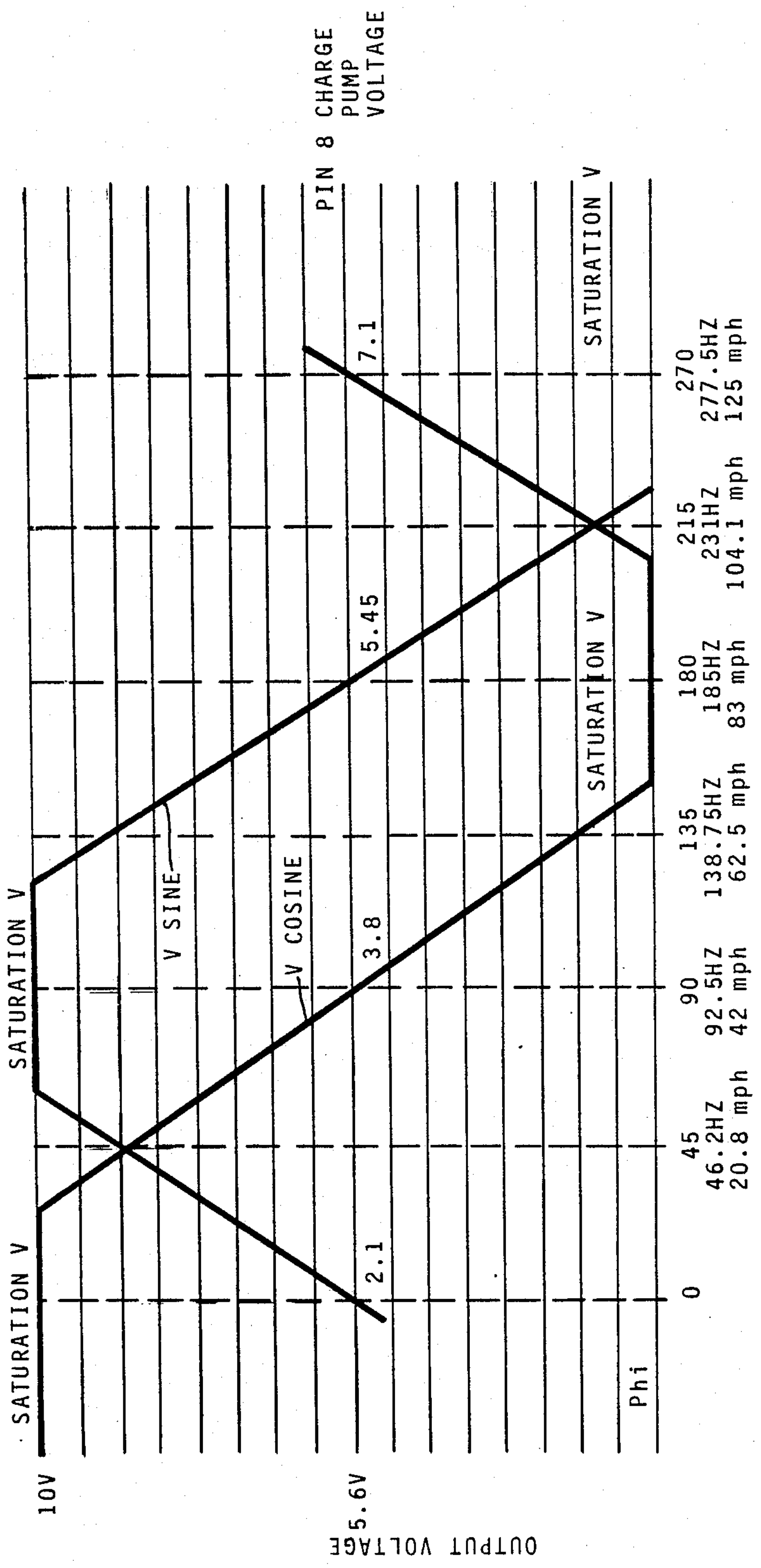
FIG. 2 is a waveform diagram of voltage sine and cosine signals along with output voltage trip points used with the integral speedometer and automatic door lock system of FIG. 1.

In FIG. 2, as is depicted, the saturation voltage derived at pin 9 causes the output of the sine or cosine amplifiers to saturate. The x-axis presents the angles in degrees associated with the various trip point for the f/v converter circuit.

Hence, to convert each Hz to mph, the Hz values are multiplied by 2.16/2.22 or 0.9729729 obtaining the mph values shown in FIG. 2 at the trip points.

The V-cosine voltage from pin 12 of f/v converter 24 is applied to an inverting input of a first operational amplifier 28 while the V-sine voltage from pin 2 is applied to a non-inverting input of a second operational amplifier 30.

A second Zener diode 32 is used to provide a reference voltage for both operational amplifiers. The reference voltage for amplifiers 28 and 30 is 9 VDC. But, for variations in output voltages from the f/v converter 24, a voltage divider network may be used to modify the reference voltage for either operational amplifier.

Illustratively, with the reference voltage at 9 VDC, and, in accordance with FIG. 2, as the speed of the vehicle increases, the V-cosine voltage decreases from a saturation voltage of 10 volts, while the V-sine voltage increases from a 5.6 VDC reference voltage. The output voltagel evel from operational amplifier 28 will be a logic 1 when V-cosine is less than the 9 VDC operational amplifier reference voltage and a logic 0 when V-cosine is greater than the reference voltage. The output-voltage level from operational amplifier 30 will be a logic 1 when V-sine is greater than the reference voltage and will be a logic 0 when V-sine is less than the reference voltage. Thus, when using the values for V-cosine and V-sine depicted in FIG. 2, the outputs of both amplifiers 28 and 30 will be a logic 0 while the vehicle speed is below 20 mph. The output of both amplifiers will be a logic 1 until the vehicle reaches a speed of about 60 mph; then, the output of amplifier 32 will change back to a logic 0.

The outputs of both operational amplifiers are applied to an OR gate 34; the output of the OR gate is applied to an enable (G) input of a D-type flip-flop 36, such as device number MM54HC75 of National Semiconductor Corporation of Santa Clara, Calif. A suitable logic HIGH voltage level is applied to data (D) input of flip-flop 36. The HIGH voltage level is transferred to a Q output when the (G) enable is HIGH. The Q output follows the data (D) input as long as the enable remains at HIGH voltage level when the (G) enable goes to a LOW voltage level, the voltage present at the data (D) input when the transition occurred, is retained at the Q-output until the (G) enable input goes to a HIGH voltage level again.

When the Q-output goes high, an NPN transistor 38, e.g., a medium current, 40 W power transistor, is turned ON causing current to flow through a capacitor 40 of a value of, e.g., 300 microfarads and then through diode 42 to a coil of a normally closed relay 44 to energize it. When relay 44 is energized, the normally open contact which is connected to a B+source is closed, causing power to be applied to the reversible drive motors 16 in such a manner as to cause the door locks to lock. The doors are automatically locked even if one or more are ajar. This current flow to relay 44 continues until the capacitor 40 becomes sufficiently charged. When the capacitor 40 becomes sufficiently charged to block current flow to relay 44, the current flow through transistor 38 continues, but is diverted primarily through resistor 46 to ground until the enable (D) input of flip-flop 36 goes to a low logic level.

The operation of system 10 will now be described. Assume an operator enters the vehicle and decides to manually lock the power door locks. Either the left or right door lock switch 12 or 14 may be used to apply B+power across the motors causing the motors to drive the door lock mechanism to a lock condition.

If the driver decides not to use the manual switches for locking the car doors, then the doors are automatically locked by system 10. Transducer 20 of FIG. 1 supplies a pulse train signal to the input of F/V converter 24 via filter network 22. F/V converter 24 generates V-cosine and V-sine waveform as defined in FIG. 2 which are used to provide data to speedometer 48 as well as to generate a logic signal for activating a motor energizing relay 44 when a predetermined speed is reached. The V-cosine and V-sine signal are applied to operational amplifiers 28 and 30, respectively. The output of amplifiers 28 and 30 are ORed by OR gate 34 to activate D-flip-flop 36 when the speed of the vehicles exceeds a speed of 20.8 mph at a chosen trip point location as depicted in FIG. 2. Transistor 38 is turned on causing relay 44 to energize. In turn, B+is applied across the power door lock motors 16. After a chosen delay determined by the chosen time constant of capacitor 40 and resistor 46, the relay 44 is de-energized. However, current will continue to flow through transistor 38 until the speed of the vehicle slows down to below 20.8 mph.

While the present invention has been disclosed in connection with a preferred embodiment thereof, it should be understood that there may be other embodiments which fall within the spirit and scope of the invention and that the invention is susceptible to modification, variation and change without departing from the proper scope or fair meaning of the following claims.

I claim:

1. A method of automatically activating a door lock motor in a vehicle integral speedometer and monitoring vehicle speed and power door lock system of the type wherein a distance sensor transducer provides a pulse-train signal of a frequency proportional to the speed of a vehicle, wherein the speed of the vehicle is monitored by a conventional speedometer, wherein an activating logic voltage is applied t a relay energizing transistor when the vehicle reaches a predetermined speed, and wherein the relay energizing transistor activates a relay which provides power to the door lock motor, which method comprises:

(a) converting the pulse-train signal into a linear voltage ranging from a minimum voltage when no pulses are provided to a maximum voltage when the pulse-repetition rate of the pulse train is maximum;

(b) generating complementary sine and cosine output voltage waveform signals about a chosen reference voltage from the linear voltages derived from the pulse train;

(c) providing the complementary sine and cosine voltage signals and the reference voltage to the speedometer;

(d) establishing a plurality of trip points for the complementary sine and cosine voltage waveform signals in order to establish magnitudes and directions of the waveform signals with respect to the linear voltages derived from the pulse train when the pulse train signal varies from the minimum to the maximum pulse repetition rate;

(e) translating one of said plurality of trip points into a reference point from which, when exceeded, a chosen magnitude and direction of both the sine and cosine waveform signals are indicative of the vehicle traveling at a predetermined speed;

(f) applying the activating logic voltage to the relay energizing transistor to activate the relay which applies power to the door lock motor when the vehicle travels at the predetermined speed that causes the magnitude and direction of the sine and cosine waveform signals to cross over said selected one of said plurality of trip points, said selected trip point being used as the reference point which is indicative of the vehicle traveling at a predetermined speed said door lock motors locking the doors even when one or more doors are open.

2. The method of claim 1 which includes terminating the power applied to the door lock motor even though the sine and cosine voltage waveform signal exceed said selected trip point.

3. A vehicle integral speedometer and power door lock system for monitoring speed and for automatically activating a door lock motor of the type wherein a distance sensor transducer provides a pulse train signal of a frequency proportional to the speed of a vehicle, wherein the speed of the vehicle is monitored by a conventional speedometer, wherein an activating logic voltage is applied to a relay energizing transistor when the vehicle reaches a predetermined speed and wherein the relay energizing transistor activates a relay which provides power to the door lock motor, which system comprises:

(a) means for converting the pulse train signal into a linear voltage ranging from a minimum voltage when no pulses are provided to a maximum voltage when the pulse repetition rate of the plse train is maximum;

(b) means for generating complementary sine and cosine output voltage waveform signals about a chosen reference voltage from the linear voltages derived from the pulse train;

(c) speedometer means for using the complimentary sine and cosine voltage signals and the reference voltage to monitor the speed of the vehicle;

(d) means for establishing a plurality of trip points for the complementary sine and cosine voltage waveform signals in order to establish magnitudes and directions of the waveform signals with respect to the linear voltages derived from the pulse train when the pulse train signal varies from the minimum to the maximum pulse-repetition rate;

(e) means for translating one of said plurality of trip points into a reference point from which, when exceeded, a chosen magnitude and direction of both the sine and cosine waveform signals are indicative of the vehicle traveling at a predetermined speed; and (f) means for applying the activating logic voltage to the relay energizing transistor to activate the relay which applies power to the door lock motor when the vehicle travels at the predetermined speed that causes the magnitude and direction of the sine and cosine waveform signals to cross over said select ed one of said plurality of trip points, said selected trip point being used as the reference point which is indicative of the vehicle traveling at the predetermined speed, said door lock motors locking the vehicle doors even when one or more doors are ajar.

4. The system of claim 3 which includes means for terminating the power applied to the door lock motor even though the sine and cosine voltage waveform signals exceed said selected trip point.

* * * * *